US 12,431,768 B2
Sep. 30, 2025

(12) United States Patent
Kuo et al.

(54) INTEGRATED MOTOR AND DRIVE ASSEMBLY

(71) Applicant: Delta Electronics, Inc., Taoyuan (TW)

(72) Inventors: Chi-Hsiang Kuo, Taoyuan (TW); Yi-Yu Lee, Taoyuan (TW); Zuo-Ying Wei, Taoyuan (TW); Yuan-Kai Liao, Taoyuan (TW); Wen-Cheng Hsieh, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 317 days.

(21) Appl. No.: 18/222,861

(22) Filed: Jul. 17, 2023

(65) Prior Publication Data

US 2024/0120812 A1 Apr. 11, 2024

Related U.S. Application Data

(60) Provisional application No. 63/414,012, filed on Oct. 7, 2022.

(30) Foreign Application Priority Data

Jun. 21, 2023 (CN) .......................... 202310740857.6

(51) Int. Cl.
  *H02K 11/30* (2016.01)
  *H02K 3/28* (2006.01)
  *H02K 5/22* (2006.01)

(52) U.S. Cl.
  CPC .............. *H02K 11/30* (2016.01); *H02K 3/28* (2013.01); *H02K 5/225* (2013.01); *H02K 2203/03* (2013.01)

(58) Field of Classification Search
  CPC ........ H02K 11/00; H02K 11/30; H02K 11/33; H02K 2211/03; H02K 5/22; H02K 5/225;
  (Continued)

(56) References Cited

U.S. PATENT DOCUMENTS

2013/0099611 A1\* 4/2013 Suga ...................... H02K 5/225
                                                    310/71
2020/0191263 A1\* 6/2020 Xiong ................. F16H 59/0217

FOREIGN PATENT DOCUMENTS

CN          103066754 A       4/2013
CN          109256908 A  *    1/2019  ............. H02K 11/30
                     (Continued)

OTHER PUBLICATIONS

Machine Translation of CN 109256908 A (Year: 2019).\*
Machine Translation of CN 213694490 U (Year: 2021).\*

*Primary Examiner* — Alexander A Singh
*Assistant Examiner* — Charlie Frank Mann, Jr.
(74) *Attorney, Agent, or Firm* — KIRTON McCONKIE; Evan R. Witt (57) ABSTRACT

An integrated motor and drive assembly is disclosed and includes a housing, a motor and a drive. The housing includes a motor-accommodation portion and a drive-accommodation portion. The drive includes a power board and a control board. The power board is made of a high thermal conductivity substrate and includes a power element and an encoder disposed on the first side, the first side faces the motor, the power board and the motor are stacked along a first direction, and the second side contacts the housing to from a heat-dissipating route. The control board is disposed adjacent to the power board. The control board and the power board are arranged along a second direction perpendicular to the first direction, and the first direction is parallel to an axial direction of the motor. A part of the power board and a part of the control board are directly contacted to form an electrical connection.

15 Claims, 7 Drawing Sheets

(58) Field of Classification Search
CPC ........ H02K 5/00; H02K 11/0094; H02K 3/28;
H02K 2203/03; H02K 5/04; H02K 9/00
See application file for complete search history.

(56) References Cited

FOREIGN PATENT DOCUMENTS

| | | | |
|---|---|---|---|
| CN | 110868025 A | | 3/2020 |
| CN | 213694490 U | * | 7/2021 |
| CN | 113726224 A | | 11/2021 |
| TW | 202137453 A | | 10/2021 |
| WO | 2010150529 A1 | | 12/2010 |
| WO | 2022172976 A1 | | 8/2022 |

* cited by examiner

INTEGRATED MOTOR AND DRIVE ASSEMBLY

CROSS-REFERENCE TO RELATED APPLICATION

This application claims the benefit of U.S. Provisional Application No. 63/414,012 filed on Oct. 17, 2022, and entitled "INTEGRATED MOTOR AND DRIVE". This application also claims priority to China Patent Application No. 202310740857.6, filed on Jun. 21, 2023. The entireties of the above-mentioned patent application are incorporated herein by reference for all purposes.

FIELD OF THE INVENTION

The present disclosure relates to an integrated motor and drive, and more particularly to a motor and drive assembly with good heat dissipation.

BACKGROUND OF THE INVENTION

A conventional motor controller includes a first circuit board and a second circuit board, both of which are made of PCB. The second circuit board is disposed under the first circuit board, and arranged corresponding to the motor in the space, so as to save the volume of the integrated motor and drive machine. The first circuit board includes several electronic components, such as an EMC filter circuit, a rectification filter circuit, a DC-DC circuit, an electrolytic capacitor and a common mode inductor, disposed thereon. The bottom surface of the first circuit board is served as a soldering surface. The electronic components, such as a microprocessor, an inverter circuit and an input-output interface circuit, are disposed on the second circuit board. The first circuit board and the second circuit board are connected through mutual pads and connection elements, so as to form an electrical connection. Since the first circuit board and the second circuit board are the two separated boards stacked up and down, the separated boards have to be electrically connected through two solder pads and conductive connectors thereon, and it is not conducive to the assembly of the integrated motor and drive machine. The two corresponding solder pads of the first circuit board and the second circuit board occupy a certain space, and it is not easy to dissipate or transfer the heat generated by the electronic components on the first circuit board and the second circuit board located at both ends of the solder joint, so that there is a risk of failure due to overheating of the electronic components. In addition, the encoder that cooperates with the motor is preferably configured to correspond to the position of the motor shaft. If the conventional motor controller has the two boards arranged in a stacking manner, there is no enough space for the encoder to be disposed axially due to the arrangement of the solder pads, and the overall thickness and height of the assembly will be increased. Furthermore, when the two boards are stacked, the available space between the stacked boards is decreased. For example, it is almost impossible to place the electronic components under the first circuit board or above the second circuit board. If the structure of two stacked boards must meet the requirements of the volume design and the same functions at the same time, it is necessary to increase the relative consumption of boards. Moreover, the radial area and the cost of the motor may be increased. Finally, in the structure of two stacked boards, the thermal-conduction direction of the voltage stabilizing capacitor is limited, and the heat dissipation efficiency is affected. The connection between the motor and the first circuit board or the connection between the motor and the second circuit board has to be achieved through the wires and the soldering process. Not only is the process cumbersome, but also the risk of solder joints loosening during the continuous operation of the motor may lead to device failure.

In order to solve many problems and deficiencies in the application of the conventional motor controllers, the present disclosure provides an integrated motor and drive assembly. By optimizing the arrangement of the control board and the power board, the consumption of boards and the conductive wires are reduced, the assembly procedure of the overall structure is simplified, the circuit conduction path is optimized and the heat dissipation efficiency is improved at the same time.

SUMMARY OF THE INVENTION

An object of the present disclosure is to provide an integrated motor and drive assembly. By optimizing the arrangement of the control board and the power board, the consumption of boards and the conductive wires are reduced, the assembly procedure of the overall structure is simplified, the circuit conduction path is optimized and the heat dissipation efficiency is improved at the same time.

Another object of the present disclosure is to provide an integrated motor and drive assembly. The housing of the integrated motor and drive assembly is divided into a motor-accommodation portion and a drive-accommodation portion for accommodating the motor and the drive, respectively. The power board of the drive and the motor are stacked in the vertical direction, so as to facilitate to directly power and drive the motor. The control board and the power board of the drive are arranged in the horizontal direction to realize the external power connection and the power control. The power board and the control board arranged in the horizontal direction are roughly arranged horizontally and flatly, and electrically connected to each other in a directly contacted, locked, fixed or attached manner to form the electrical connection. In this way, when the power board is made of a high thermal conductivity substrate, the power element disposed on the power board can be directly thermally connected with the lower drive bottom plate and the heat dissipation device to form a heat-dissipating path vertical to the power board for heat dissipation. The heat dissipation effect is better than that of conventional circuit board so that the electronic components are protected effectively. Furthermore, the integrated motor and drive assembly includes the voltage stabilizing capacitor disposed on the control board, and the thermal interface materials are attached to the top and bottom of the voltage stabilizing capacity, so as to form at least two heat-dissipating paths perpendicular to the control board. Thereby, the heat dissipation efficiency is enhanced and the voltage stabilizing capacitor is protected effectively. Since the power board and the control board are arranged and extended along the horizontal direction, the upper and lower sides of the power board and the control board can be used to arrange the electronic components or increase the heat dissipation area. Moreover, the heat-dissipating paths of the power board and the control board do not interfere with each other. The housing structure can further cooperate with the air-cooled or water-cooled heat dissipation structure to enhance the heat dissipation effect. In other words, under the condition of satisfying the same function, the power board and the control board arranged and extended in the horizontal direction are beneficial to reduce the consumption of board materials and improve the overall heat dissipation performance. On the other hand, the electrical connection between the power board and the motor, the electrical connection between the power board and the control board, and/or the electrical connection between the control board and the external power source can be realized in a directly contacted, locked, fixed or attached manner, without additional cables or copper strips cooperate used for electrical conduction. Therefore, the assembly process is simplified and the material cost is decreased. On the other hand, the stacked structure of the power board and the motor in the vertical direction is conducive to the direct connection of the electrical contact points of the three-phase windings of the motor and the three-phase electrical contact points of the power board. Furthermore, with the position of the encoder integrated on the power board corresponding to the axial direction of the motor, it is more conducive to achieving the effects of saving configuration area and simplifying wiring.

In accordance with an aspect of the present disclosure, an integrated motor and drive assembly is provided and includes a housing, a motor and a drive. The housing includes a motor-accommodation portion and a drive-accommodation portion. The motor is accommodated in the motor-accommodation portion. The drive is accommodated in the drive-accommodation portion and includes a power board and a control board. The power board is made of a high thermal conductivity substrate and includes a first side and a second side opposite to each other, a power element and an encoder. The power element and the encoder are disposed on the first side, the first side faces the motor, the power board and the motor are stacked along a first direction, and the second side contacts the housing to form a first heat-dissipating path. The control board is disposed adjacent to the power board. The control board and the power board are arranged along a second direction, the first direction and the second direction are perpendicular to each other, and the first direction is parallel to an axial direction of the motor, wherein a part of the power board and a part of the control board are directly contacted to form an electrical connection.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "upper," "lower" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals.

Please refer to FIG. 1 to FIG. 6. They illustrate an integrated motor and drive assembly according to an embodiment of the present disclosure. In the embodiment, an integrated motor and drive assembly 1 is provided and includes a housing 10, a motor 20 and a drive 3. The housing 10 includes a motor-accommodation portion 11 and a drive-accommodation portion 12. The motor 20 is accommodated in the motor-accommodation portion 11. The drive 3 is accommodated in the drive-accommodation portion 12. In the embodiment, the drive 3 includes a power board 30 and the control board 40. Preferably but not exclusively, the power board 30 is a made of a high thermal conductivity substrate. Moreover, the power board 30 includes a first side 301 and a second side 302 opposite to each other, a power element 31 and an encoder 32. In the embodiment, the power element 31 and the encoder 32 are disposed on the first side 301, and the first side 301 faces the motor 20. Moreover, the power board 30 and the motor 20 are stacked along a first direction (i.e., the Z axial direction), and the second side 302 contacts the housing 10 to form a first heat-dissipating path P1 along the first direction (i.e., the Z axial direction). In the embodiment, the control board 40 is spatially corresponding to the power board 30. The control board 40 and the power board 30 are disposed adjacent to each other. Preferably but not exclusively, the control board 40 and the power board 30 are arranged and extended along a second direction (i.e., the X axial direction). In the embodiment, the first direction and the second direction are perpendicular to each other, and the first direction is parallel to an axial direction of the motor shaft C of the motor 20. In the embodiment, a part of the power board 30 and a part of the control board 40 are directly contacted to form an electrical connection.

Figure 1:
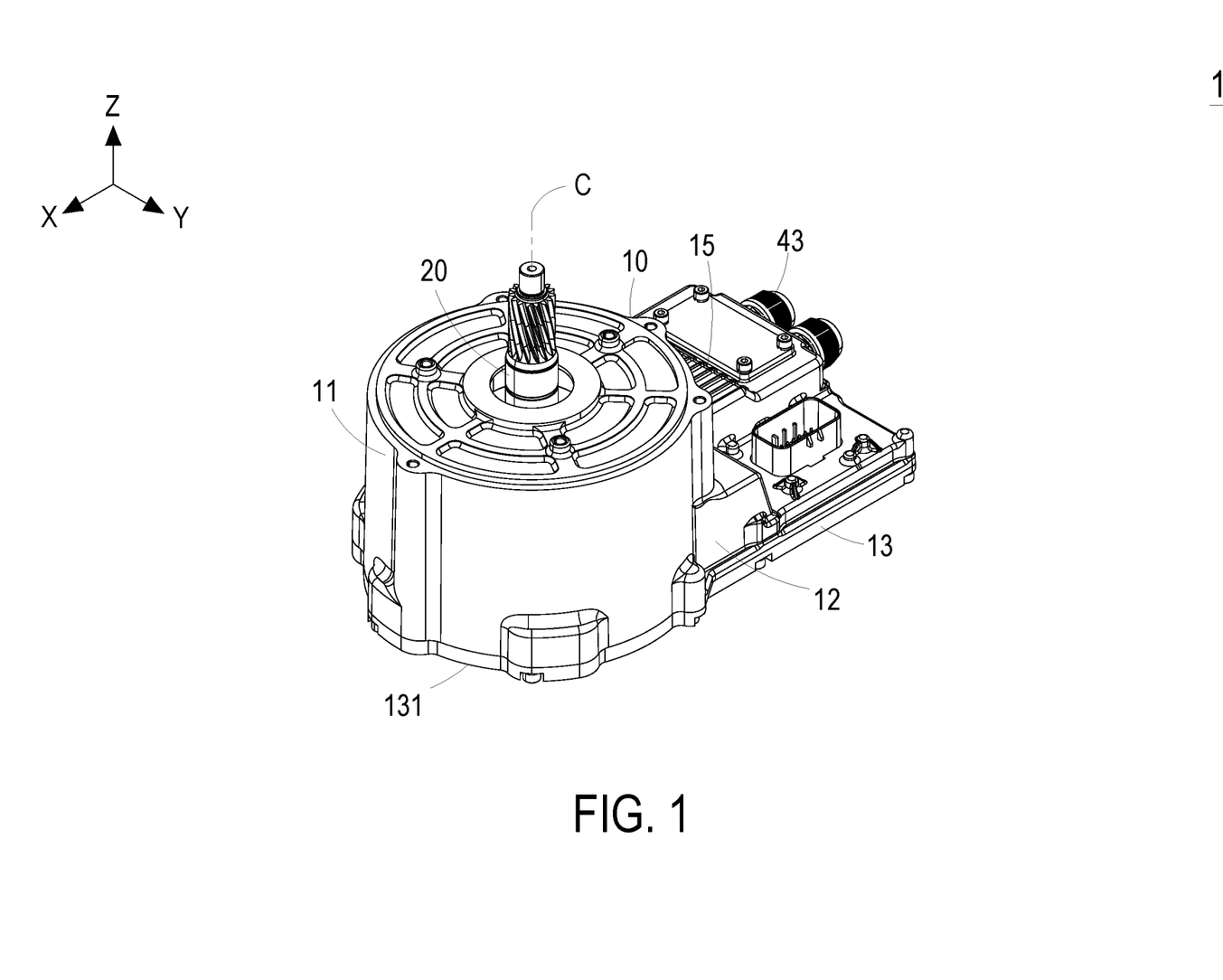
FIG. 1 is a perspective structural view illustrating an integrated motor and drive assembly according to an embodiment of the present disclosure.
Figure 2:
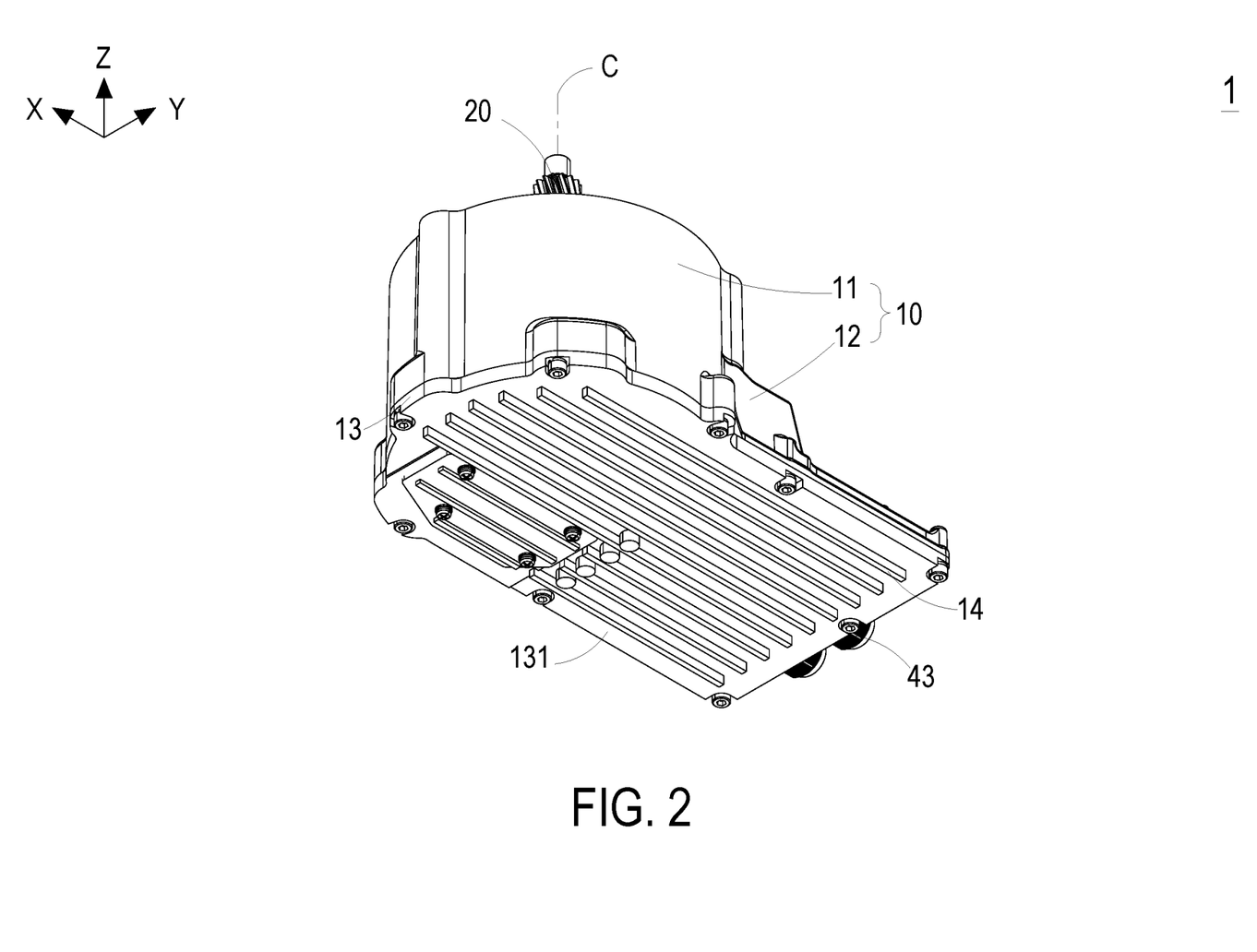
FIG. 2 is a perspective structural view illustrating the integrated motor and drive assembly according to the embodiment of the present disclosure and taken from another perspective.

In the embodiment, the motor-accommodation portion 11 is arranged adjacent to the drive-accommodation portion 12. Preferably but not exclusively, the motor-accommodation portion 11 and the drive-accommodation portion 12 are communicated up and down in the Z axial direction, and arranged side by side in the X axial direction. In the embodiment, the motor 20 includes electric contact points 21 of three-phase windings on a stator side connected downwards through the drive-accommodation portion 12. The power board 30 includes three-phase contact points 33 disposed on the first side 301 and spatially corresponding to the electric contact points 21 of the three-phase windings on the stator side of the motor 20. Preferably but not exclusively, in the embodiment, the three-phase contact points 33 on the power board 30 and the electric contact points 21 of the three-phase windings on the stator side of the motor 20 are connected by means of a screw-nut or locking element, so as to contact directly and form an electrical connection. In the embodiment, the drive-accommodation portion 12 includes a main body 120, and the housing 10 further includes a drive bottom plate 13 disposed adjacent to the main body 120. In the embodiment, the drive bottom plate 13 has an inner side 130 spatially corresponding to the drive-accommodation portion 12, and the inner side 130 is in contact with the second side 302 of the power board 30 and a bottom side 402 of the control board 40 to form a thermal connection. In the embodiment, the drive bottom plate 13 has an outer side 131 spatially corresponding to the drive-accommodation portion 12, and the outer side 131 is in contact with an external heat dissipation device 14, for example a heat sink, to form a thermal connection, as shown in FIG. 2. Notably, in the embodiment, the power board 30 is made of the high thermal conductivity substrate. Preferably but not exclusively, the high thermal conductivity substrate is one selected the group consisting of a direct bonding aluminum (DBA) substrate, a direct bonding aluminum with copper (DBAC) substrate, a glass fiber reinforced epoxy laminated material (FR4) substrate, an insulated metal core PCB (MCPCB), and an insulated metal substrate, IMS), or a board constructed with a metal substrate or a ceramic substrate. In the embodiment, the drive bottom plate 13, the power board 30 and the motor 20 are stacked along the first direction (i.e., the Z axial direction), and it facilitates to directly power and drive the motor 20. In addition, since the voltage stabilizing capacitor (the details will be described later) is placed to the control board 40, the power board 30 has enough space to install the encoder 32, and the encoder 32 can meet the configuration requirements corresponding to the position of the motor shaft C of the motor 20. In the embodiment, the power element 31 on the power board 30 is thermally connected to the drive bottom plate 13 and the heat dissipation device 14 through the power board 30 with high thermal conductivity, so as to form the first heat-dissipating path P1 perpendicular to the power board 30 for heat dissipation. Its heat dissipation efficiency is better than that of conventional circuit boards and can effectively protect the electronic components such as the power element 31 and the encoder 32.

Figure 3:
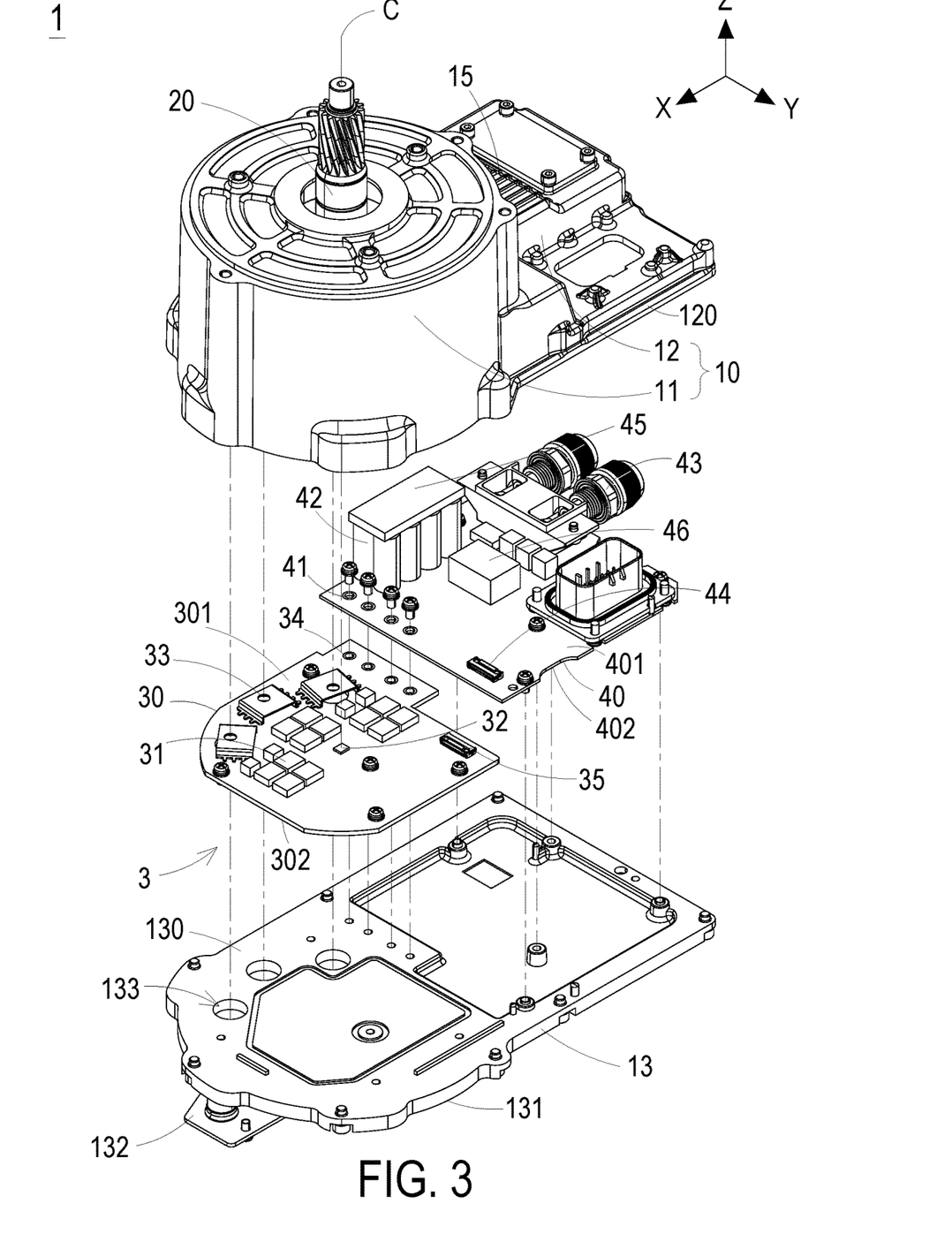
FIG. 3 is an exploded view illustrating the integrated motor and drive assembly according to the embodiment of the present disclosure.
Figure 4:
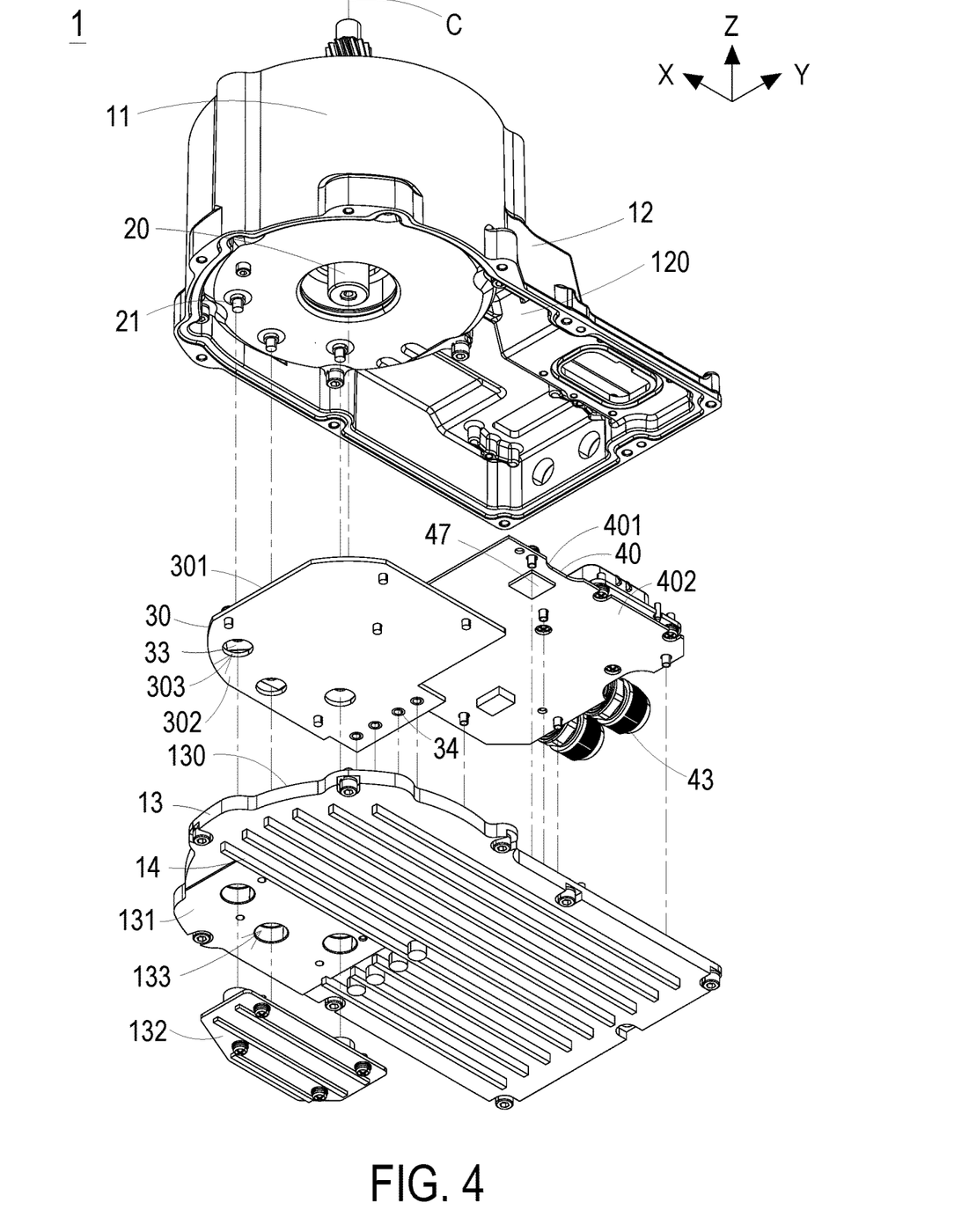
FIG. 4 is an exploded view illustrating the integrated motor and drive assembly according to the embodiment of the present disclosure and taken from another perspective.
Figure 5:
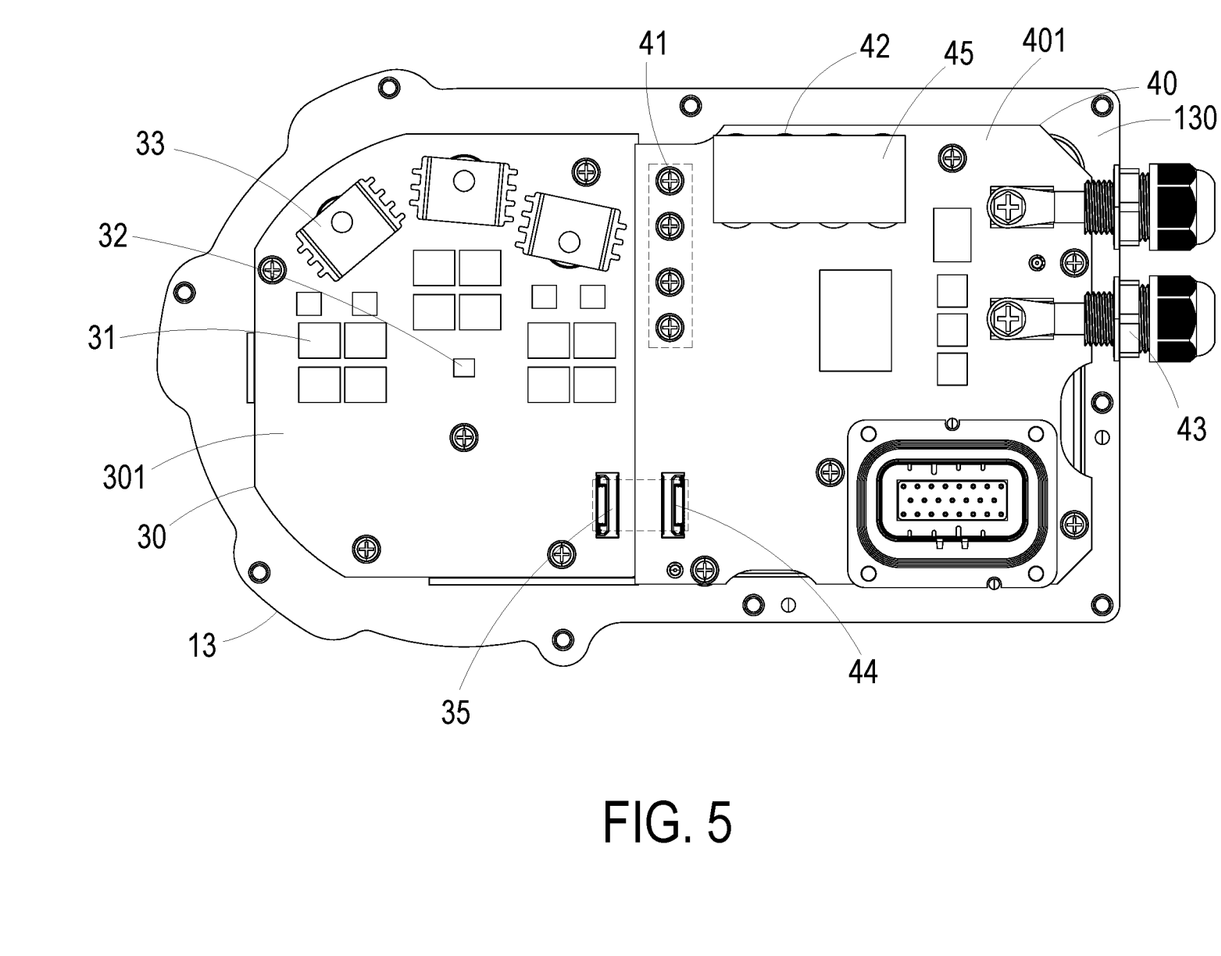
FIG. 5 is top view illustrating the drive of the integrated motor and drive assembly according to the embodiment of the present disclosure.
Figure 6:
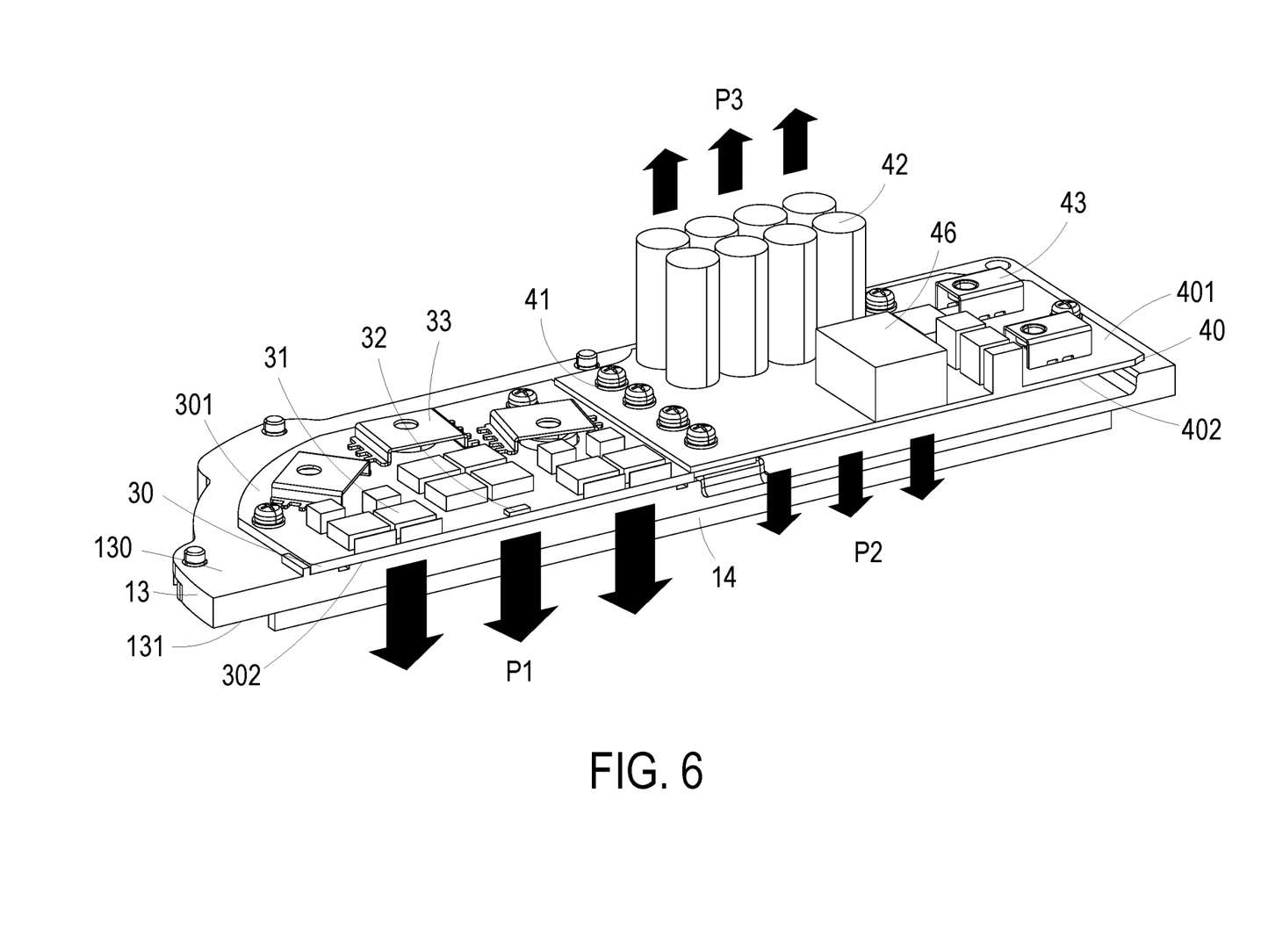
FIG. 6 is a schematic diagram showing the heat dissipation path of the electronic element in the integrated motor and drive assembly of the present disclosure.

On the other hand, in the embodiment, the control board 40 of the drive 3 and the power board 30 are horizontally arranged and extended along the second direction (i.e., the X axial direction), so as to realize the external power connection and the power control. The power board 30 and the control board 40 arranged in the horizontal direction (second direction) are roughly arranged horizontally. Preferably but not exclusively, a part of the power board 30 and a part of the control board 40 are attached flatly and electrically connected to each other in a directly contacted, locked, fixed or attached manner to form the electrical connection. In the embodiment, the power board 30 includes a plurality of first electrical connection points 34, and the control board 40 includes a plurality of second electrical connection points 41. Preferably but not exclusively, as shown in FIG. 3, the plurality of second electrical connection points 41 are corresponding to and overlapped with the plurality of first electrical connection points 34 when observed from or in a viewing direction of the first direction (i.e., the Z axial direction). In the embodiment, the plurality of second electrical connection points 41 of the control board 40 are spatially corresponding to and directly contacted with the plurality of first electrical connection points 34 of the power board 30 through the screw-fastening to form the electrical connection. In other embodiments, the plurality of second electrical connection points 41 and the plurality of first electrical connection points 34 corresponding thereto are electrically connected in a directly contacted, locked, fixed or attached manner to form the electrical connection. Since the electrical connection of the power board 30 and the control board 40 is realized in a directly contacted, locked, fixed or attached manner, without needing of additional cables or copper strips cooperate used for electrical conduction. Therefore, the assembly process is simplified and the material cost is decreased. Preferably but not exclusively, in the embodiment, the signal transmission between the power board 30 and the control board 40 is realized through the electrical coupling of a first communication interface 35 on the power board 30 and a second communication interface 44 on the control board 40. The present disclosure is not limited thereto, and not redundantly described herein.

In the embodiment, the control board 40 includes a power-in end 43 configured to be electrically connected to an external power source. Preferably but not exclusively, the external power source is a utility power or a battery. Certainly, the electrical connection of the external power source and the power-in end 43 is realized in a directly contacted, locked, fixed or attached manner, and the present disclosure is not limited thereto. Furthermore, in the embodiment, the integrated motor and drive assembly 1 further includes a voltage stabilizing capacitor 42 disposed on a top side 401 of the control board 40. Preferably but not exclusively, the voltage stabilizing capacitor 42 is located between the power-in end 43 and the plurality of second electrical connection points 41. In the embodiment, the power element 31 on the power board 30 and the voltage stabilizing capacitor 42 on the control board 40 are arranged along the second direction (i.e., the X axial direction). The plurality of second electrical connection points 41 on the control board 40 and the plurality of first electrical connection points 34 on the power board 30 are arranged along a third direction (i.e., the Y axial direction), respectively. The third direction is perpendicular to the second direction and the first direction. In the embodiment, the plurality of second electrical connection points 41 and the plurality of first electrical connection points 34 are located between the power element 31 and the voltage stabilizing capacitor 42. In this way, the power board 30 and the control board 40 are combined to form a power-in circuit, the power-in path is optimized and the circuit impedance is reduced. Furthermore, in the embodiment, the control board 40 and the motor 20 are misaligned in a viewing direction (i.e., the first direction or the Z axial direction shown in FIG. 3) parallel to the axial direction of the motor shaft C of the motor 20. In the embodiment, the voltage stabilizing capacitor 42 is contacted to the main body 120 of the drive-accommodation portion 12 through a thermal interface material (TIM) 45. In this way, the voltage stabilizing capacitor 42 is thermally connected with the main body 120 of the drive-accommodation portion 12 and the heat dissipation device 15 outside the housing 10, to form a third heat-dissipating path P3, parallel to the first direction (i.e., the Z axial direction shown in FIG. 3). In the embodiment, the control board 40 below the voltage stabilizing capacitor 42 is connected to the drive bottom plate 13 through a thermal interface material 47, or directly contacted to the drive bottom plate 13, so that the bottom surface 402 of the control board 40 is thermally connected to the inner side 130 of the drive bottom plate 13 in the drive-accommodation portion 12 and the heat dissipation device 14 attached to the outer side 131. That is, a second heat-dissipating path P2 is formed and parallel to the first direction (i.e., the revered Z axial direction shown in FIG. 3), so as to dissipate the heat generated by the voltage stabilizing capacitor 42 or other electronic components 46.

From the above, the voltage stabilizing capacitor 42 of the integrated motor and drive assembly 1 is disposed on the control board 40. Moreover, by attaching the thermal interface material 45 above the voltage stabilizing capacitor 42 and connecting the control board 40 through the thermal interface material 47 attached below, there are the second heat-dissipating path P2 and the third heat-dissipating path P3 perpendicular to the control board 40 formed to enhancing the heat dissipation efficiency and protect the voltage stabilizing capacitor 42 effectively. Since the power board 30 and the control board 40 are horizontally arranged and flatly attached to the inner side 130 of the drive bottom plate 13, the first side 301 and the second side 302 of the power board 30, and the top side 401 and the bottom side 402 of the control board 40 can be used to arrange the electronic components or increase the heat dissipation area, so as to achieve the better placement density of electronic components or the higher heat dissipation efficiency. Moreover, the first heat-dissipating path P1 of the power element 31 on the power board 30 and the second heat-dissipating path P2 of the voltage stabilizing capacitor 42 on the control board 40 do not interfere with each other. The structure of the housing 10 with the heat dissipation devices 14, 15 disposed above and below can further cooperate with the air-cooled or water-cooled heat dissipation structure (not shown) to enhance the heat dissipation effect. In other words, under the condition of satisfying the same function, the power board 30 and the control board 40 arranged and extended in the horizontal direction are beneficial to reduce the consumption of board materials, reduce the wiring, soldering and assembling process, and improve the overall heat dissipation performance.

Figure 7:
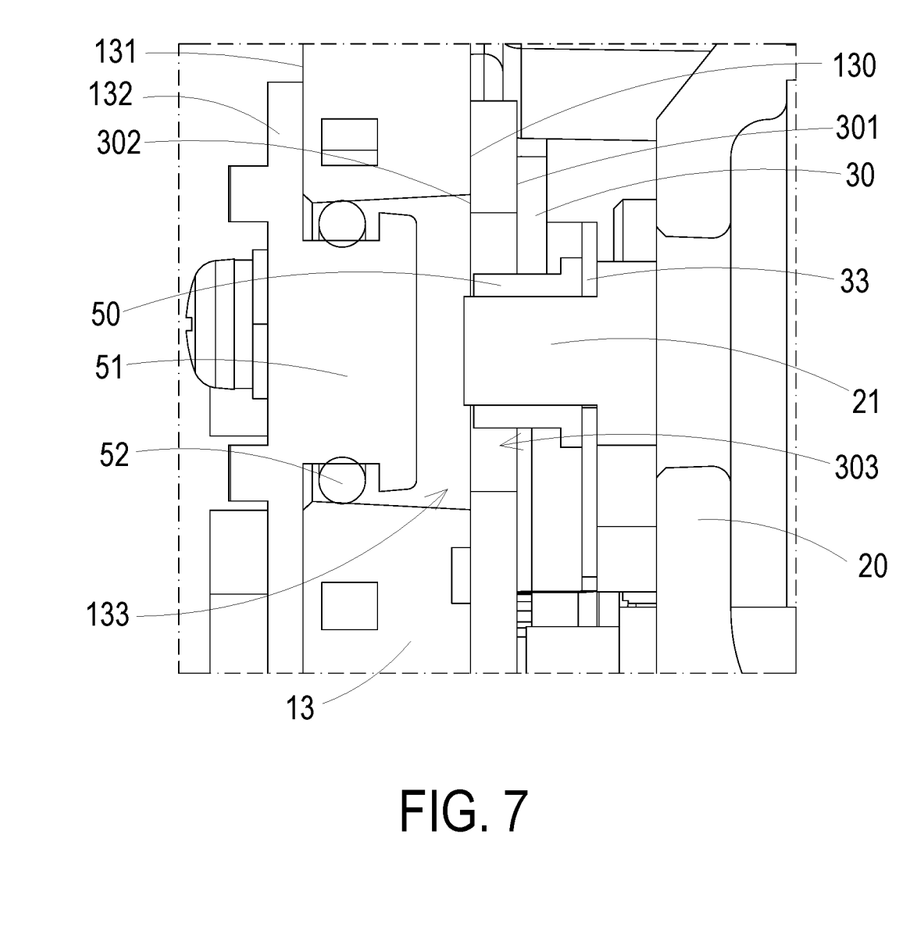
FIG. 7 is a schematic diagram showing the direct contact connection between the electrical contact points of the three-phase winding of the motor and the three-phase contact points of the power board in the integrated motor and drive assembly of the present disclosure.

Furthermore, in the embodiment, the drive bottom plate 13, the power board 30 and the motor 20 are stacked along the first direction (i.e., the Z axial direction), and it facilitates to directly power and drive the motor 20 and optimize the heat-dissipating paths at the same time. In addition, the stacked structure of the drive bottom plate 13, the power board 30 and the motor 20 is also conducive to simplifying the operation of electrical connections. FIG. 7 is a schematic diagram showing the direct contact connection between the electrical contact points of the three-phase winding of the motor and the three-phase contact points of the power board in the integrated motor and drive assembly of the present disclosure. Please refer to FIG. 1 to FIG. 7. In the embodiment, the drive bottom plate 13 includes three first through holes 133 and a cover plate 132. The three first through holes 133 pass through the inner side 130 and the outer side 131 of the drive bottom plate 13. Preferably but not exclusively, the three first through holes 133 are spatially corresponding to the three-phase contact points 33 of the power board 30 and the electric contact points 21 of the three-phase windings of the motor 20. Preferably but not exclusively, in the embodiment, the three-phase contact points 33 are disposed on the first side 301 of the power board 30, and the power board 30 further includes three second through holes 303 spatially corresponding to the three-phase contact points 33 and the three first through holes 133 of the drive bottom plate 13. For achieving the electrical connection of the three-phase contact points 33 of the power board 30 and the electric contact points 21 of the three-phase windings of the motor 20, the three fastening elements 50, for example screw nuts pass through the three first through holes 133 and the three second through holes 303, respectively, to fasten the electrical contact points 21 of the three-phase windings. In that, the three-phase contact points 33 and the electrical contact points 21 of the three-phase windings corresponding thereto are directly contacted to form the electrical connection. Thereafter, the cover plate 132 covers the three first through holes 133 from the outer side 131 of the drive bottom plate 13 so as to complete the assembly. Preferably but not exclusively, in the embodiment, the cover plate 132 and the drive bottom plate 13 are fastened through the screws. In the embodiment, the cover plate 132 includes a protrusion 51 spatially corresponding to the three first through holes 133. When the cover plate 132 and the drive bottom plate 13 are fastened with each other, the protrusion 51 is accommodated in the first through hole 133, and engaged with the drive bottom plate 13 through the sealing element 52 to form a tight connection and achieve waterproof and dustproof effects. Preferably but not exclusively, the sealing element 52 is an O-ring. Certainly, the manners for achieving the electrical connection between the three-phase contact points 33 of the power board 30 and the electric contact points 21 of the three-phase windings of the motor 20 are adjustable according to the practical requirements. Any electrical connection methods such as directly contacted, locked, fixed and attached manners are also applicable to the present disclosure. The present disclosure is not limited to the illustrated embodiments and not redundantly described hereafter.

Notably, the electrical connection between the power board 30 and the motor 20, the electrical connection between the power board 30 and the control board 40, and/or the electrical connection between the control board 40 and the external power source can be realized in a directly contacted, locked, fixed or attached manner, without additional cables or copper strips cooperate used for electrical conduction. Therefore, the assembly process is simplified and the material cost is decreased. On the other hand, the stacked structure of the power board 30 and the motor 20 in the vertical direction is conducive to the direct connection of the electrical contact points 21 of the three-phase windings of the motor 20 and the three-phase electrical contact points 33 of the power board 30. Furthermore, with the position of the encoder 32 integrated on the power board 30 corresponding to the axial direction of the motor shaft C of the motor 20, it is more conducive to achieving the effects of saving configuration area and simplifying wiring. Certainly, the arrangement of the electronic components on the power board 30 and the control board 40 are adjustable but not limited to the illustrated embodiments. It is not redundantly described hereafter.

In summary, the present disclosure provides an integrated motor and drive assembly. By optimizing the arrangement of the control board and the power board, the consumption of boards and the conductive wires are reduced, the assembly procedure of the overall structure is simplified, the circuit conduction path is optimized and the heat dissipation efficiency is improved at the same time. The housing of the integrated motor and drive assembly is divided into a motor-accommodation portion and a drive-accommodation portion for accommodating the motor and the drive, respectively. The power board of the drive and the motor are stacked in the vertical direction, so as to facilitate to directly power and drive the motor. The control board and the power board of the drive are arranged in the horizontal direction to realize the external power connection and the power control. The power board and the control board arranged in the horizontal direction are roughly arranged horizontally and flatly, and electrically connected to each other in a directly contacted, locked, fixed or attached manner to form the electrical connection. In this way, when the power board is made of a high thermal conductivity substrate, the power element disposed on the power board can be directly thermally connected with the lower drive bottom plate and the heat dissipation device to form a heat-dissipating path vertical to the power board for heat dissipation. The heat dissipation effect is better than that of conventional circuit board so that the electronic components are protected effectively. Furthermore, the integrated motor and drive assembly includes the voltage stabilizing capacitor disposed on the control board, and the thermal interface materials are attached to the top and bottom of the voltage stabilizing capacity, so as to form at least two heat-dissipating paths perpendicular to the control board. Thereby, the heat dissipation efficiency is enhanced and the voltage stabilizing capacitor is protected effectively. Since the power board and the control board are arranged and extended along the horizontal direction, the upper and lower sides of the power board and the control board can be used to arrange the electronic components or increase the heat dissipation area. Moreover, the heat-dissipating paths of the power board and the control board do not interfere with each other. The housing structure can further cooperate with the air-cooled or water-cooled heat dissipation structure to enhance the heat dissipation effect. In other words, under the condition of satisfying the same function, the power board and the control board arranged and extended in the horizontal direction are beneficial to reduce the consumption of board materials and improve the overall heat dissipation performance. On the other hand, the electrical connection between the power board and the motor, the electrical connection between the power board and the control board, and/or the electrical connection between the control board and the external power source can be realized in a directly contacted, locked, fixed or attached manner, without additional cables or copper strips cooperate used for electrical conduction. Therefore, the assembly process is simplified and the material cost is decreased. On the other hand, the stacked structure of the power board and the motor in the vertical direction is conducive to the direct connection of the electrical contact points of the three-phase windings of the motor and the three-phase electrical contact points of the power board. Furthermore, with the position of the encoder integrated on the power board corresponding to the axial direction of the motor, it is more conducive to achieving the effects of saving configuration area and simplifying wiring.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An integrated motor and drive assembly comprising:
   a housing comprising a motor-accommodation portion and a drive-accommodation portion;
   a motor accommodated in the motor-accommodation portion; and
   a drive accommodated in the drive-accommodation portion and comprising:
      a power board made of a high thermal conductivity substrate and comprising a first side and a second side opposite to each other, a power element and an encoder, wherein the power element and the encoder are disposed on the first side, the first side faces the motor, the power board and the motor are stacked along a first direction, and the second side contacts the housing to form a first heat-dissipating path; and
      a control board disposed adjacent to the power board, wherein the control board and the power board are arranged along a second direction, the first direction and the second direction are perpendicular to each other, and the first direction is parallel to an axial direction of the motor, wherein a part of the power board and a part of the control board are directly contacted to form an electrical connection.

2. The integrated motor and drive assembly according to claim 1, wherein the motor-accommodation portion is arranged adjacent to the drive-accommodation portion, wherein a depth of the motor-accommodation portion in the first direction is greater than a depth of the drive-accommodation portion in the first direction.

3. The integrated motor and drive assembly according to claim 1, wherein the power board comprises three-phase contact points disposed on the first side, and spatially corresponding to electric contact points of three-phase windings on a stator side of the motor, wherein the three-phase contact points and the electric contact points of the three-phase windings are directly contacted to form an electrical connection.

4. The integrated motor and drive assembly according to claim 1, wherein the drive-accommodation portion comprises a main body, and the housing further comprises a drive bottom plate disposed adjacent to the main body, wherein the drive bottom plate has an inner side spatially corresponding to the drive-accommodation portion, and the inner side is in contact with the second side of the power board and a bottom side of the control board to form thermal connections, wherein the bottom side of the control board and the inner side of the drive bottom plate forms a second heat-dissipating path.

5. The integrated motor and drive assembly according to claim 4, further comprising a voltage stabilizing capacitor disposed on a top side of the control board, and thermally contacted with the main body of the drive-accommodation portion to form a third heat-dissipating path.

6. The integrated motor and drive assembly according to claim 5, wherein the voltage stabilizing capacitor is connected to the main body of the drive-accommodation portion through a thermal interface material (TIM).

7. The integrated motor and drive assembly according to claim 4, wherein the drive bottom plate comprises an outer side spatially corresponding to the drive-accommodation portion, and the outer side is in contact with an external heat dissipation device to form a thermal connection.

8. The integrated motor and drive assembly according to claim 7, wherein the drive bottom plate comprises three first through holes and a cover plate, the power board comprises three-phase contact points disposed on the first side, the three first through holes are spatially corresponding to the three-phase contact points of the power board and electric contact points of three-phase windings of the motor, wherein the three-phase contact points and the electrical contact points of the three-phase windings corresponding thereto are fastened by three fastening elements passing through the three first through holes, and the cover plate covers the three first through holes from the outer side of the drive bottom plate.

9. The integrated motor and drive assembly according to claim 8, wherein the three-phase contact points of the power board are disposed on the first side of the power board, and the power board further comprises three second through holes spatially corresponding to the three-phase contact points and the three first through holes, wherein the three fastening elements pass through the three first through holes and the three second through holes, respectively, to fasten the electrical contact points of the three-phase windings.

10. The integrated motor and drive assembly according to claim 9, wherein the high thermal conductivity substrate is one selected from the group consisting of a direct bonding aluminum (DBA) substrate, a direct bonding aluminum with copper (DBAC) substrate, a glass fiber reinforced epoxy laminated material (FR4) substrate, an insulated metal core PCB (MCPCB), and an insulated metal substrate, IMS), or a board constructed with a metal substrate or a ceramic substrate.

11. The integrated motor and drive assembly according to claim 1, wherein the power board comprises a plurality of first electrical connection points, the control board comprises a plurality of second electrical connection points, and the plurality of second electrical connection points of the control board are in corresponding contact with the plurality of first electrical connection points of the power board to form the electrical connection.

12. The integrated motor and drive assembly according to claim 11, further comprising a voltage stabilizing capacitor disposed on a top side of the control board, and electrically connected to the plurality of second electrical connection points.

13. The integrated motor and drive assembly according to claim 12, wherein the power element and the voltage stabilizing capacitor are arranged along the second direction, the plurality of second electrical connection points and the plurality of first electrical connection points are arranged along a third direction, respectively, the third direction is perpendicular to the second direction and the first direction, and the plurality of second electrical connection points and the plurality of first electrical connection points are located between the power element and the voltage stabilizing capacitor.

14. The integrated motor and drive assembly according to claim 11, wherein the plurality of second electrical connection points are corresponding to and overlapped with the plurality of first electrical connection points when observed from the first direction.

15. The integrated motor and drive assembly according to claim 11, wherein the plurality of second electrical connection points and the plurality of first electrical connection points corresponding thereto are electrically connected in a directly contacted, locked, fixed or attached manner to form the electrical connection.

* * * * *